United States Patent
Daigo et al.

(10) Patent No.: US 6,918,363 B2
(45) Date of Patent: Jul. 19, 2005

(54) VALVE DRIVE APPARATUS OF INTERNAL-COMBUSTION ENGINE

(75) Inventors: Yasunori Daigo, Tokyo (JP); Masahiro Maekawa, Tokyo (JP); Toru Kawatani, Tokyo (JP); Manabu Horiuchi, Kawasaki (JP); Satoshi Nakajima, Kawasaki (JP); Koichi Kawamoto, Kawasaki (JP)

(73) Assignees: Mitsubishi Fuso Truck and Bus Corporation (JP); Fusco Engineering Corporation (JP)

( * ) Notice: Subject to any disclaimer, the term of this patent is extended or adjusted under 35 U.S.C. 154(b) by 0 days.

(21) Appl. No.: 10/952,279

(22) Filed: Sep. 28, 2004

(65) Prior Publication Data

US 2005/0066920 A1 Mar. 31, 2005

(30) Foreign Application Priority Data

Sep. 30, 2003 (JP) ........................................ 2003-340835

(51) Int. Cl.[7] ................................................. F01L 1/34
(52) U.S. Cl. ............................... 123/90.16; 123/90.39; 123/90.44; 123/90.15
(58) Field of Search .......................... 123/90.15, 90.16, 123/90.39, 90.44, 90.12, 90.17, 90.18, 90.27, 90.31, 568.11, 568.21

(56) References Cited

U.S. PATENT DOCUMENTS 4,357,917 A * 11/1982 Aoyama ..................... 123/348
6,755,022 B2 * 6/2004 Kim et al. ..................... 60/608
6,769,392 B2 * 8/2004 Lawrence et al. .......... 123/305

FOREIGN PATENT DOCUMENTS

JP        2000-345872 A    12/2000

* cited by examiner

Primary Examiner—Thomas Denion
Assistant Examiner—Ching Chang
(74) Attorney, Agent, or Firm—Rossi, Kimms & McDowell, LLP (57) ABSTRACT

The valve drive apparatus of the invention comprises an exhaust valve drive mechanism capable of changing an open/close timing of an exhaust valve, and a control device which controls the exhaust valve drive apparatus so as to release the exhaust valve during an intake stroke, independently of an exhaust stroke, in an EGR mode. Preferably, the exhaust valve drive mechanism comprises a first exhaust cam which defines the exhaust valve releasing timing and the amount of valve lift in the exhaust stroke, and a second exhaust cam which defines the exhaust valve releasing timing and the amount of valve lift during the intake stroke. In an normal mode, the displacement of the first exhaust cam is transmitted to the exhaust valve, and in the EGR mode, the displacement of the second exhaust cam is transmitted to the exhaust valve, in addition to the displacement of the first exhaust cam.

8 Claims, 10 Drawing Sheets

VALVE DRIVE APPARATUS OF INTERNAL-COMBUSTION ENGINE

CROSS-REFERENCE TO RELATED APPLICATIONS

This application is based upon and claims the benefit of priority from prior Japanese Patent Application No. 2003-340835, filed Sep. 30, 2003, the entire contents of which are incorporated herein by reference.

BACKGROUND OF THE INVENTION

1. Field of the Invention

The present invention relates to a valve drive apparatus of an internal-combustion engine for realizing internal EGR.

2. Description of the Related Art

A reciprocating engine (internal-combustion engine) mounted on an automobile performs EGR (exhaust gas recirculation), that is, to recirculate part of engine exhaust gas to the intake side, as required, in order to improve the composition of exhaust gas and activate the catalyst earlier. Recently, as the EGR, aside from an external EGR which requires relay pipes around the engine, an internal EGR not requiring such pipes comes to be used. In the internal EGR, out of the engine combustion cycles (intake, compression, expansion and exhaust cycles), an intake valve is opened while an exhaust valve is opened in an exhaust stroke. By making use of the overlap period of exhaust and intake occurring at this time, part of exhaust gas is mixed into the air sucked in from the intake valve.

While the engine is running, at the time of idling or other low load time, the temperature of exhaust gas is low, and the catalyst does not function sufficiently. It is hence required to heat the catalyst to the active temperature in a short time. In such a case, by encouraging the EGR, it is known that the cylinder internal temperature is raised to elevate the exhaust gas temperature earlier. To enable such sufficient EGR, hitherto, the engine has been provided with a valve timing control device for shifting the cam phase to the advancing direction or retarding direction. In such a valve timing control device, by adjusting a phase difference between an open/close timing of the exhaust valve in the exhaust stroke and an open/close timing of the intake valve in the intake stroke, the overlap amount is increased, and the recirculation flow of exhaust gas is increased.

Besides, for example, in Jpn. Pat. Appln. KOKAI Publication No. 2000-345872, a valve timing control device designed for changing over the cams is disclosed. In this device, by changing over the cams for driving the exhaust valve or intake valve, the mode is changed to one in which an overlap amount is increased.

To increase the overlap amount, it is required to start releasing of the intake valve before the end point of the exhaust stroke. However, since the intake valve is released in the vicinity of the top dead center of a piston, when the overlap amount is increased, the intake valve interferes with the piston. Therefore, by the increase of the overlap amount alone, the EGR is limited, so that it is hard to enhance the effect of the internal EGR.

BRIEF SUMMARY OF THE INVENTION

It is hence an object of the invention to provide a valve drive apparatus of an internal-combustion engine capable of enhancing the effect of an internal EGR.

According to the present invention, a valve drive apparatus of an internal-combustion engine comprises:

an exhaust valve drive mechanism capable of changing an open/close timing of an exhaust valve; and a control device which controls the exhaust valve drive mechanism to release the exhaust valve during an intake stroke, independently of an exhaust stroke, in an EGR mode.

In such a configuration, the timing for causing part of exhaust gas to flow into a cylinder can be freely set within the intake stroke. As a result, it is easier to adjust the amount of exhaust gas mixed in the intake air, so that the effect of EGR may be enhanced.

Preferably, the exhaust valve drive mechanism is configured to release the exhaust valve in the vicinity of the point of time when the amount of valve lift of an intake valve reaches the maximum value during the intake stroke.

In such a configuration, a greater amount of EGR is realized.

Preferably, the exhaust valve drive mechanism comprises:

a first exhaust cam which defines the exhaust valve releasing timing and the amount of valve lift in the exhaust stroke;

a second exhaust cam which defines the exhaust valve releasing timing and the amount of valve lift during the intake stroke; and a mode selection mechanism which transmits the displacement of the first exhaust cam to the exhaust valve in an normal mode, and transmits the displacement of the second exhaust cam to the exhaust valve, in addition to the displacement of the first exhaust cam, in the EGR mode.

In such a configuration, the internal EGR is realized by a simple combination of cams, and the related structure can be simplified.

Preferably, the valve drive apparatus further comprises:

an intake valve drive mechanism capable of setting the amount of valve lift of the intake valve in the intake stroke in the EGR mode at a value smaller than the amount of valve lift in the normal mode, wherein the control device controls the intake valve drive mechanism so that the amount of valve lift of the intake valve in the EGR mode is smaller than the amount of valve lift in the normal mode.

In such a configuration, the amount of intake air flowing in from the intake valve can be suppressed at the time of EGR, so that the effect of EGR may be further enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

A first embodiment of the invention will be described below while referring to FIGS. 1 to 12.

Figure 1:
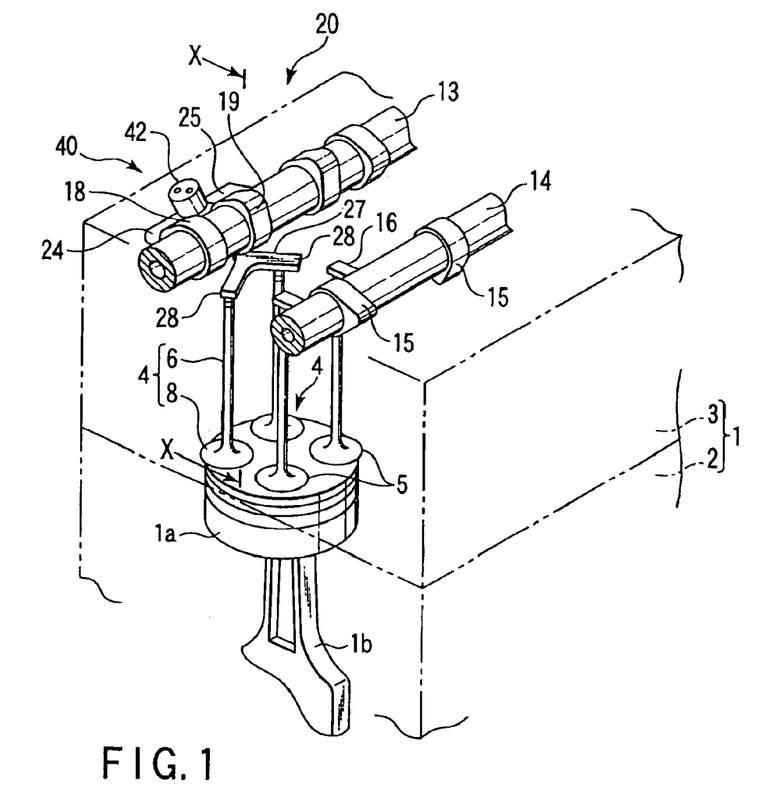
FIG. 1 is a perspective view schematically showing a valve drive apparatus according to an embodiment of the invention.
Figure 3:
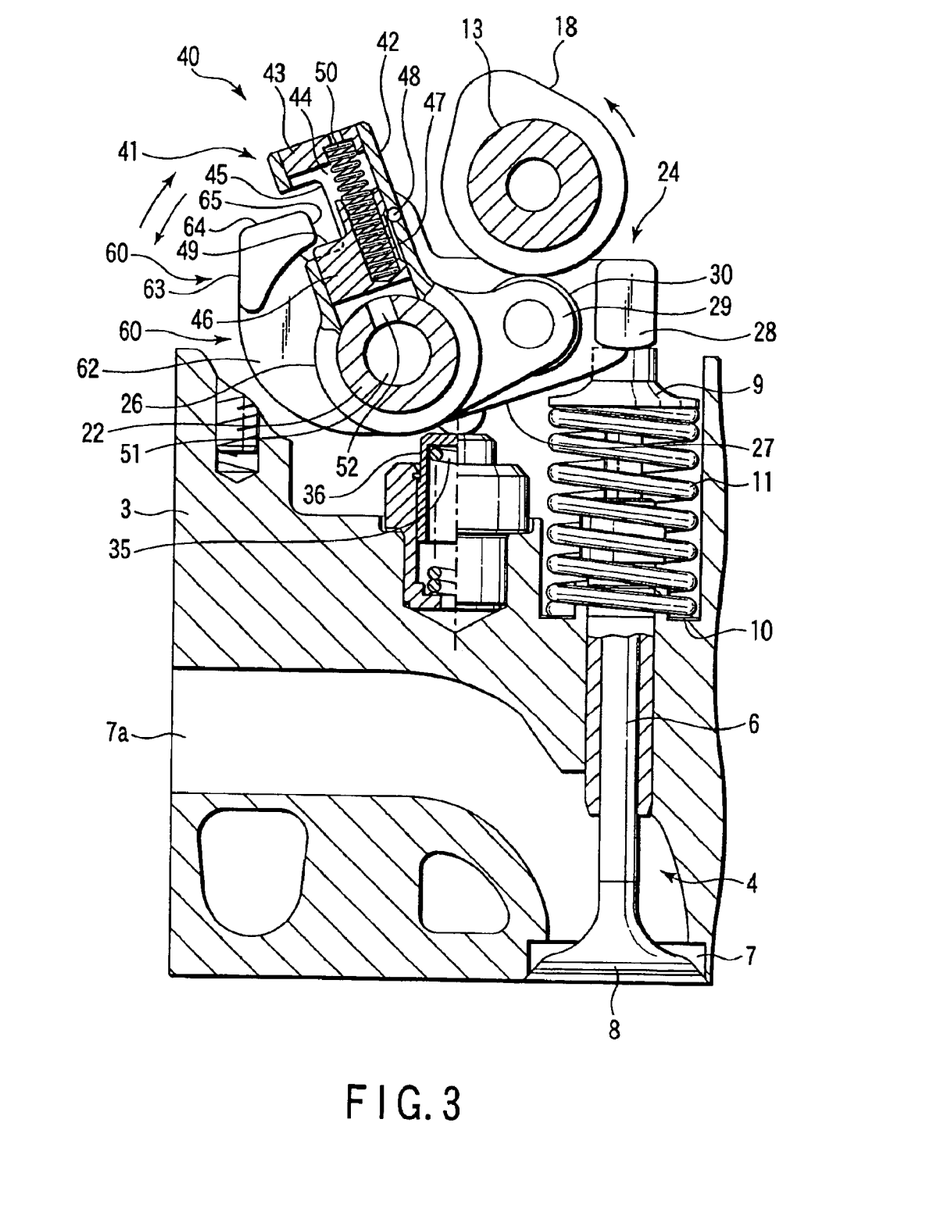
FIG. 3 is a sectional view of an exhaust side of the valve drive apparatus taken along line X—X in FIG. 1.

FIG. 1 shows essential parts of an internal-combustion engine according to the invention. This is a reciprocating engine, and is configured to generate a driving force by repeating the cycle consisting of intake, compression, expansion, and exhaust strokes. More specifically, the diagram shows a valve drive apparatus of a diesel engine in which plural cylinders (not shown) are arranged along a cam shaft. FIG. 3 shows a section of an exhaust side of the valve drive apparatus (the section in the direction of arrow X in FIG. 1).

In FIG. 1, reference numeral 1 denotes an engine body. The engine body 1 is composed of a cylinder block 2 and a cylinder head 3. The cylinder block 2 incorporates plural cylinders (not shown) arranged in the lateral direction. The cylinder head 3 is connected to the head of the cylinder block 2. Each cylinder in the cylinder block 1 has a reciprocating piston 1a housed therein. Each piston 1a is coupled to a crankshaft (not shown) by way of a connecting rod 1b.

In the cylinder head 3, for example, two exhaust valves 4 and two intake valves 5 are assembled in every cylinder. Each exhaust valve 4 has, as shown in FIG. 3, a valve stem 6 installed in the cylinder head 2 slidably in the vertical direction, and a valve head 8 for opening and closing an exhaust port 7 opened to the lower side of the cylinder head 1.

Further, as shown in FIG. 3, a valve spring 11 is inserted in a compressed state between a flange 9 provided at the upper end of the valve stem 6 and a seat 10 formed on the upside of the cylinder head 3. The exhaust port 7 is configured to be closed in an ordinary state by the exhaust valve 4 which is pushed up by the elastic force of the valve spring 11, and to be opened when the exhaust valve 4 is pushed down. Although not explained specifically, a similar structure is also formed at the intake valve 5 side. In the diagram, reference numeral 7a denotes an exhaust passage inside the cylinder head 2 communicating with the exhaust port 7.

Above the cylinder head 3, an exhaust cam shaft 13 is rotatably provided at a position shifted to the outer side (width direction) from the exhaust valve 4 as shown in FIGS. 1 and 3. Similarly, an intake cam shaft 14 is rotatably provided at a position shifted to the outer side (width direction) from the intake valve 5 as shown in FIG. 1. The cam shafts 13, 14 are-driven and rotated by the output from the crankshaft (not shown) of the engine.

At the lower side of the intake cam shaft 14, a T-shaped rocker arm 16 (partly shown in FIG. 1) is disposed. The rocker arm 16 transmits the displacement of the intake cam 15 (one is provided in each cylinder) formed in the cam shaft 14 to the upper end of the valve stem of the intake valve 5 of each cylinder. As a result, the intake valve 5 is opened or closed according to the contour profile of the cam 15 (defining the intake stroke when the engine is operated in the normal mode).

By contrast, at the lower side of the exhaust cam shaft 13, a mode selection mechanism 40 is provided. This mode selection mechanism 40 is configured to transmit the displacement of plural cams, or two cams in this example (first exhaust cam 18 and second exhaust cam 19), formed in the cam shaft 13 to the upper end of the valve stem 6 of the exhaust valve 4 selectively. The mode selection mechanism 40 is provided in each cylinder. In this way, the exhaust valve drive mechanism 20 is configured to use the cam selectively. That is, the first exhaust cam 18 corresponds to the normal mode (normal operation mode not using EGR), and is formed to open the exhaust valve 4 in the exhaust stroke, and to compose the combustion cycle (intake, compression, expansion, exhaust) together with the intake valve 5. The second exhaust cam 19 is disposed adjacently to the first exhaust cam 18, and is formed to open the exhaust valve 4 during the intake stroke in the EGR mode (that is, in the period in which the intake valve 5 is opened).

Figure 4:
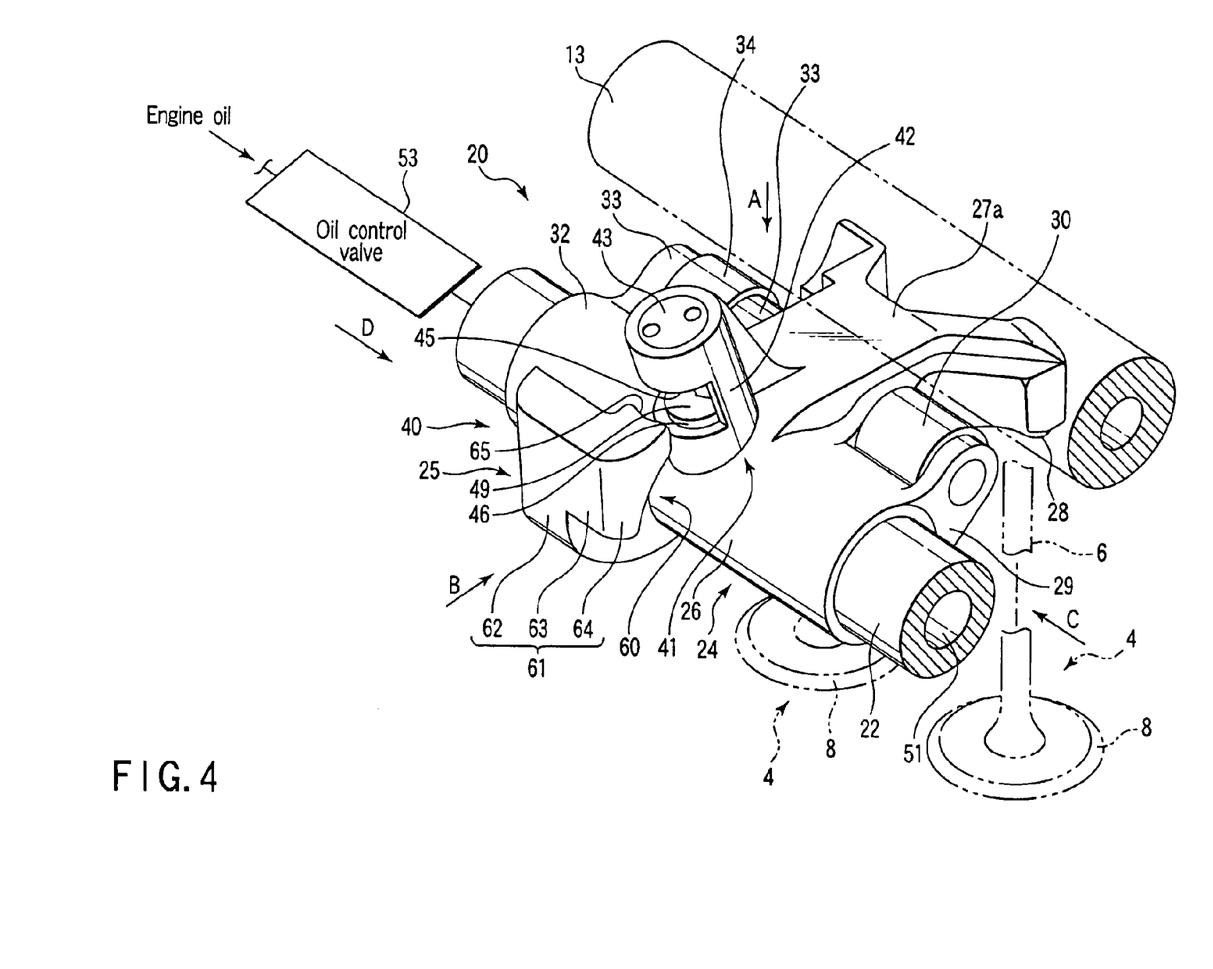
FIG. 4 is a perspective view showing a schematic configuration of an exhaust valve drive mechanism.
Figure 5:
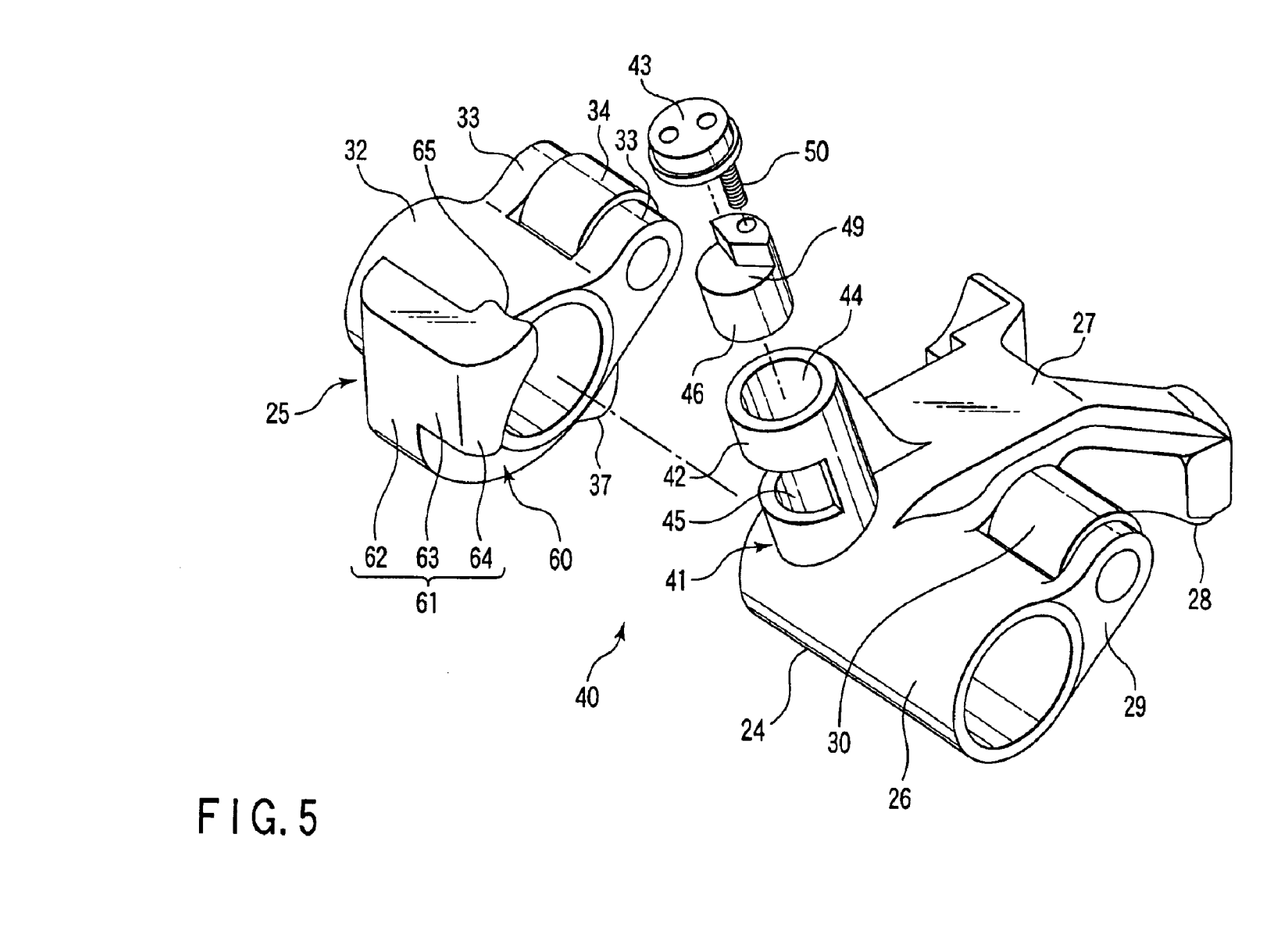
FIG. 5 is an exploded assembly view of a mode selection mechanism.
Figures 6, 7:
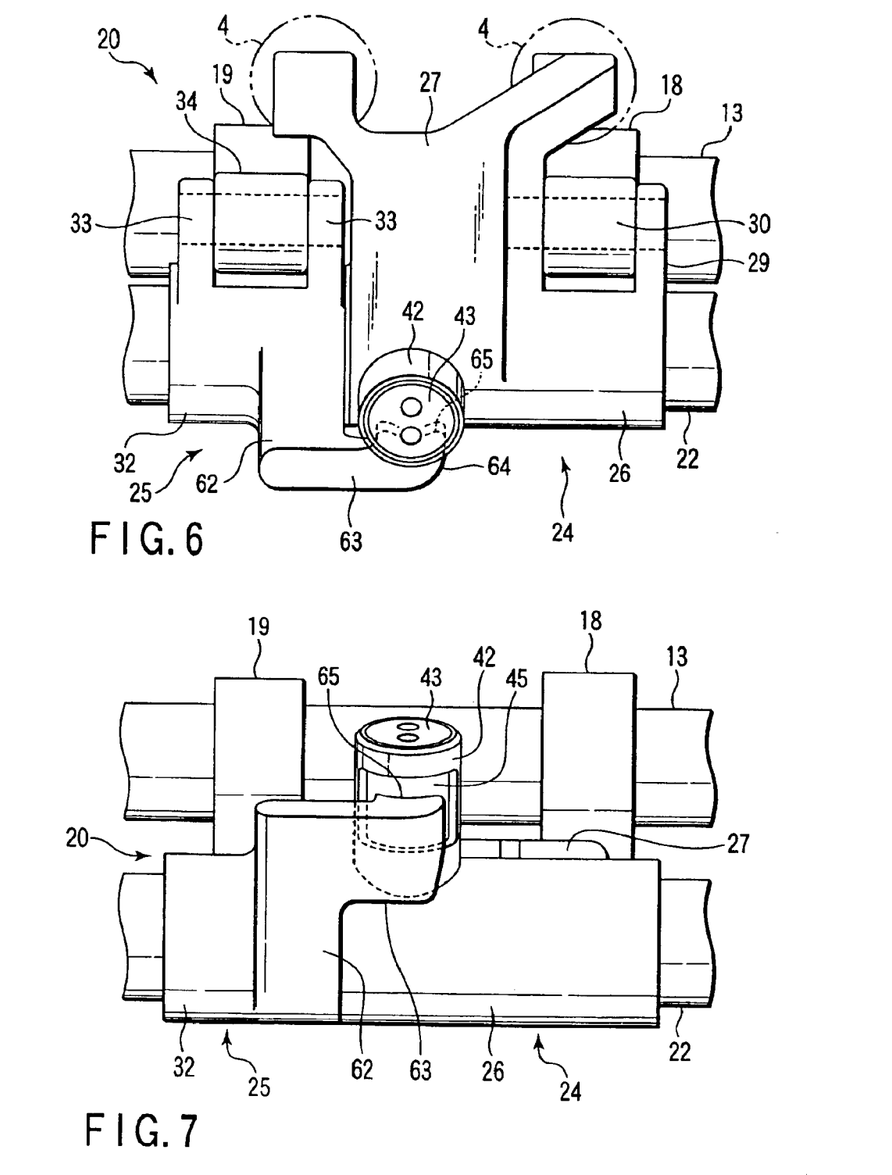
FIG. 6 is a diagram of the exhaust valve drive mechanism as seen from the direction of arrow A in FIG. 4.
FIG. 7 is a diagram of the exhaust valve drive mechanism as seen from the direction of arrow B in FIG. 4.

FIG. 4 shows a schematic configuration of the exhaust valve drive mechanism 20. FIG. 5 is an exploded view of essential parts of the mode selection mechanism 40. FIGS. 6 to 9 show the exhaust valve drive mechanism 20 as seen from various directions (directions A to D in FIG. 4).

Figure 2A:
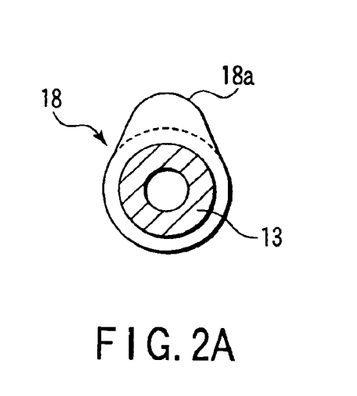
FIG. 2A is a diagram showing a first exhaust cam for driving an exhaust valve in a normal mode.

The function of the exhaust valve drive mechanism 20 will be specifically described below. One of the cams for exhaust valve, that is, the first exhaust cam 18 has a contour profile for defining the open/close timing of the exhaust valve and the amount of valve lift in the normal mode as shown in FIG. 2A. By contrast, the other cam for exhaust valve, that is, the second exhaust cam 19 has a contour profile for defining the opening timing of the exhaust valve 4 and the amount of valve lift during the intake stroke in the EGR mode as shown in FIG. 2B.

Figure 2B:
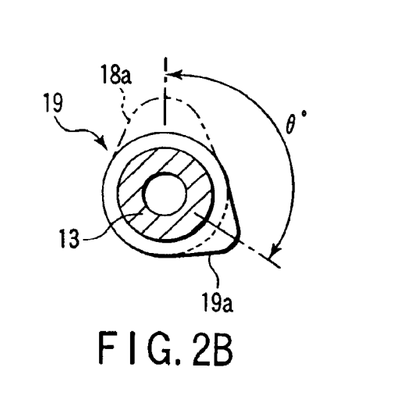
FIG. 2B is a diagram showing a second exhaust cam for driving the exhaust valve in an EGR mode.

As shown in FIG. 2B, the second exhaust cam 19 has a structure having a same base circle as the first exhaust cam 18 for the normal mode. The top 19a of the second exhaust cam 19 is provided at a position shifted to θ° delayed side from the top 18a of the first exhaust cam 18 such that the second exhaust cam 19 opens the exhaust valve 4 in the vicinity of the point of time when the amount of the valve lift of the intake valve reaches the maximum value during the intake stroke. On the basis of this position, the contour profile is formed for defining the releasing timing and the amount of valve lift for assuring the internal EGR required in the engine, on the outer circumference of the second exhaust cam 19. The maximum amount of valve lift of the second exhaust cam 19 for the EGR mode is set smaller than the maximum amount of valve lift of the first exhaust cam 18 for the normal mode.

In FIGS. 3 and 4, reference numeral 22 denotes a rocker shaft. The rocker shaft 22 is disposed parallel to the cam shaft 13 at the lower side of the cam shaft 13, and is positioned at the opposite side of the exhaust valve 4 with the cam shaft 13 placed in the middle. On the rocker shaft 22, the mode selection mechanism 40 is supported so as to use the cam selectively as shown in FIGS. 4 to 9.

Figure 9:
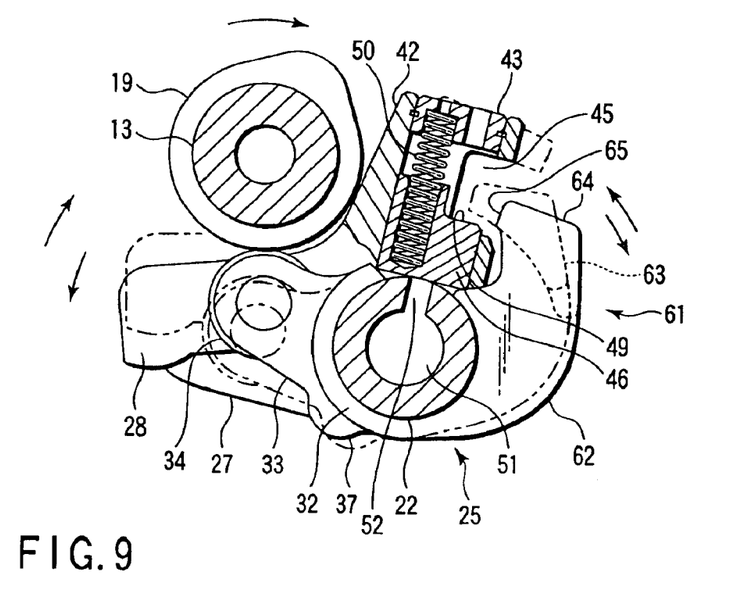
FIG. 9 is a sectional view of the exhaust valve drive mechanism when the first exhaust cam is selected in the normal mode as seen from the direction of arrow D in FIG. 4.

The mode selection mechanism 40 is composed as follows. The rocker shaft 22 has, in every cylinder, a rocker arm for the normal mode (first rocker arm 24) and rocker arm for the EGR mode (second rocker arm 25) disposed adjacently to each other. The first rocker arm 24 for the normal mode includes, as shown in FIGS. 4 and 5, a cylindrical boss 26 fitted rotatably to the rocker shaft 22 at a position corresponding to the center of the cylinder, and an arm 27 extending from the boss 26 to the upper end of the valve stem 6 of the exhaust valve 4. The arm 27 is branched in a Y-form near the leading end thereof, and valve pokers 28 are formed at the leading end thereof. These valve pokers 28 are positioned at the lower side of the cam shaft 13 as shown in FIG. 9, and are positioned immediately above each valve stem 6 of the exhaust valve 4.

From the end of the boss 26 at the opposite side of the second rocker arm 25 side, a roller support wall 29 projects immediately beneath the first exhaust cam 18. Between the side of the roller support wall 29 and the side of the opposite arm 27, a roller 30 used as a cam follower is supported rotatably. This roller 30, as shown in FIG. 3, contacts with the first exhaust cam 18 mounted on the cam shaft 13, and transmits the displacement of the first exhaust cam 18 to the first rocker arm 24 at the lower side of the cam shaft 13. Therefore, when the first exhaust cam 18 rotates, the arm 27 rotates about the rocker shaft 22 according to the contour profile of the first exhaust cam 18, and the displacement of the first exhaust cam 18 is transmitted to the upper end of the valve stem 6, thereby pushing down (releasing) or returning (closing) the exhaust valve 4 (normal mode).

By contrast, the second rocker arm 25 for the EGR mode includes, as shown in FIGS. 4 to 7, a cylindrical boss 32 fitted rotatably to the rocker shaft 22 at a position adjacent to the boss 26, and a pair of roller support walls 33 projecting from the boss 32 to immediately beneath the second exhaust cam 19. Between the sides of the pair of roller support walls 33, a roller 34 used as a cam follower is rotatably supported. The roller support walls 33 are, as shown in FIG. 3, pushed up by an elastic element for returning disposed on the upside of the cylinder head 3, for example, a pin-shaped pushing member 36 having a return spring 35 incorporated therein. The roller 34 contacts with the second exhaust cam 19 by the elastic force of the return spring 35. Reference numeral 37 is a bump formed in the lower part of the roller support walls 33 for contacting with the leading end of the pushing member 36. Therefore, when the second exhaust cam 19 rotates, the second rocker arm 25 rotates about the rocker shaft 22 according to the contour profile of the second exhaust cam 19 (EGR mode).

Between the first rocker arm 24 and the second rocker arm 25, there are variable transmission mechanisms (41, 60) for transmitting, in the EGR mode, the displacement of the second exhaust cam 19 to the first rocker arm 24 by way of the second rocker arm 25. The variable transmission mechanisms in this example are composed of push-contact type structure which is rare in generation of shearing stress and low in stress level.

The variable transmission mechanisms (41, 60) are composed as follows. In FIGS. 4 to 9, reference numeral 41 show a first abutting section and 60 is a second abutting section. The first abutting section 41 projects from the first rocker arm 24, and rotates together with the first rocker arm 24. The second abutting section 60 projects from the second rocker arm 25, and rotates together with the second rocker arm 25. The first abutting section 41 and second abutting section 60 are disposed side by side along the rotating direction of the rocker shaft 22. More specifically, the first abutting section 41 is disposed closer to the cam shaft 13, and the second abutting section 60 is far from the cam shaft 13. The first abutting section 41 in this example is of vertical piston structure.

The vertical piston structure is composed as follows. In FIGS. 2 to 4, reference numeral 42 is a cylindrical lug. The cylindrical lug 42 is formed to project to the upper side from the position near the rocker shaft 22 of the first rocker arm 24, that is, from the upper part of the boss 26. To avoid interference with the cam shaft 13, the cylindrical lug 42 is inclined in a direction apart from the cam shaft 13. The hollow space in this cylindrical lug 42 continues to the inside of the boss 26 as shown in FIG. 3. The upper end of the cylindrical lug 42 is closed by a lid member 43.

Inside the cylindrical lug 42, a cylinder chamber 44 is formed from the lower side of the lid member 43 to the outer circumference of the rocker shaft 22. A piston 46 is accommodated in the cylinder chamber 44. The piston 46 can slide vertically in the cylinder chamber 44 in a state arrested by an anti-rotation mechanism. The anti-rotation mechanism in this example shown in FIG. 3 is composed of a groove 47 extending in the axial direction formed in part of the outer circumference of the piston 46, and a pin 48 projecting from the wall of the storage wall 42 so as to be engaged with the groove 47.

At the back side of the cylinder chamber 44 (opposite side of cam shaft 13), a window 45 is formed by cutting out part of the wall of the cylindrical lug 42 in a rectangular form. In the upper stage part of the back side of the piston 46, a notch 49 is processed and formed along the profile of the window 45. The window 45 and notch 49 are arranged so that the notch 49 is positioned in the window 49 (FIG. 3) when the piston 46 is at the lower end, and that the outer circumference of the piston 46 contacting with the lower side of the notch 29 is positioned in the window 45 when the piston 46 is at the upper end.

The piston 46 is pressed to the lower end side by the elastic force of an elastic member, for example, a coil spring 50 inserted in the compressed state between the lid member 43 and the piston 46. Therefore, usually, the notch 49 is positioned in the window 45. Further, the piston 46 supplies oil pressure into the cylinder chamber 44, and is pressed to the upper end side. As a result, the outer circumferential part of the piston 46 appears in the window 45.

As the route of supplying such oil pressure into the cylinder chamber 44, in the example shown in FIG. 3, a route 51 is formed in the rocker shaft 22, and also a through-hole 52 is formed in the peripheral wall of the rocker shaft 22 for communicating between the route 51 and the bottom of the cylinder chamber 44. As shown in FIG. 4, engine oil is supplied in the route 51 from the end of the rocker shaft 22, and is introduced into the lower part of the cylinder chamber 44 by way of the through-hole 52. At the upstream side of the rocker shaft 22, in a supply route of engine oil, an oil control valve 53 is provided for opening and closing this supply route. The through-hole 51 is provided at a position for supplying the engine oil in the cylinder chamber 44 regardless of the rotating angle of the first rocker arm 24.

The oil control valve 53 (FIG. 4) is closed in the normal mode. In this state, therefore, the piston 46 is at the lower end, and the notch 49 is positioned in the window 45. By contrast, in the EGR mode, the oil control valve 53 is opened. Hence, the piston 46 moves to the upper end, and the outer circumferential part of the piston 46 appears in the window 45.

By contrast to this first abutting section 41, the second abutting section 60 has an arm 61. This arm 61 is extended from the back side of the second rocker arm 25 (the opposite side of the cam shaft 13), and its leading end is formed to turn around to the back side of the first abutting section 41. More specifically, as shown in FIGS. 4 to 7, the arm 61 is composed by combining a first portion 62 projecting upward from the back side of the boss 32 (the opposite side of the cam shaft 13), a second portion 63 extending in the lateral direction from the end of this first portion 62 and reaching up to the position of the cylindrical lug 42 facing the window 45, and a third portion 64 projecting from the end of this second portion 63 in the forward direction (to the direction of the cam shaft 13).

Figure 8:
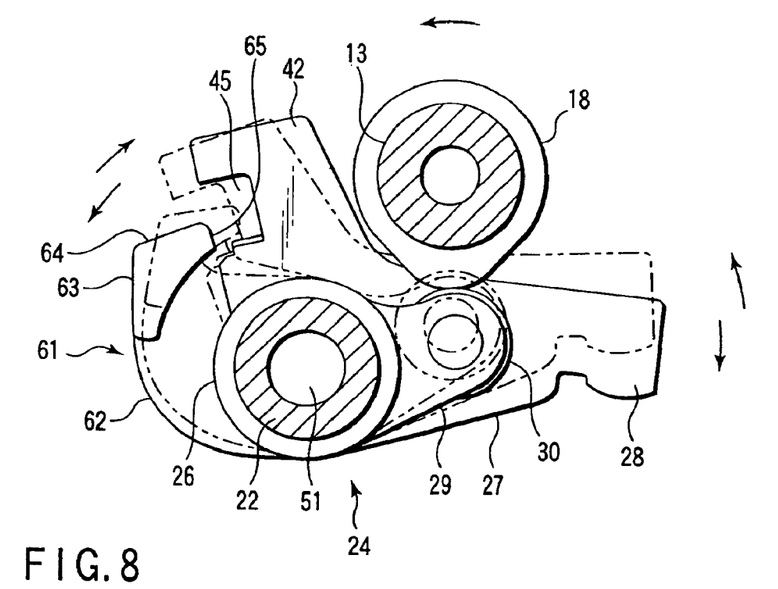
FIG. 8 is a sectional view of the exhaust valve drive mechanism when the first exhaust cam is selected in the normal mode as seen from the direction of arrow C in FIG. 4.
Figure 10:
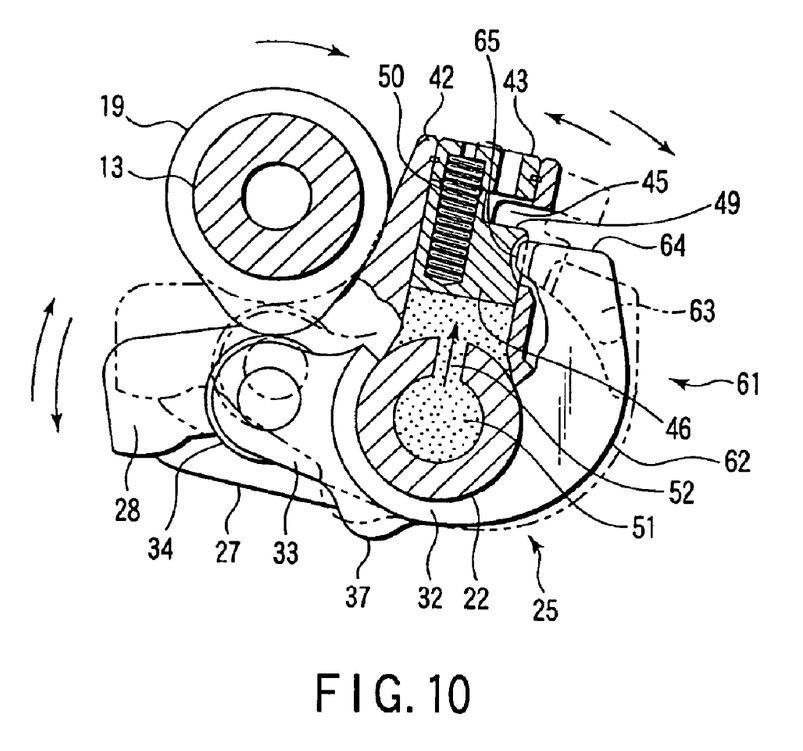
FIG. 10 is a sectional view of the exhaust valve drive mechanism when the second exhaust cam is selected in the EGR mode.

A poking portion 65 is formed at the leading end of the third portion 64, and the poking portion 65 moves into the window 45 or moves away from the window 45 according to rotation of the second rocker arm 25. While the notch 49 is positioned in the window 45, the poking portion 65 moves freely in the notch 49 as shown in FIGS. 8 and 9, and does not interfere with the first abutting section 41 (hence, the first rocker arm 24). In other words, the depth of the notch 49 is set in a dimension so as not to contact with the poking portion 65. By contrast, when the outer circumference of the piston 46 is positioned in the window 45, as shown in FIG. 10, the poking portion 65 abuts against the outer circumference of the piston 46 according to the rotation of the second rocker arm 25, and thereby rotates the first abutting section 41 (hence, the first rocker arm 24).

That is, when oil pressure is supplied in the cylinder chamber 44, along with rotation of the second rocker arm 25, the poking portion 65 abuts against the outer circumference of the piston 46, and the displacement of the second exhaust cam 19 for the EGR mode is transmitted to the exhaust valve 4 by way of the second rocker arm 25 and first rocker arm 24. In addition, the displacement of the first exhaust cam 19 for the normal mode is also transmitted to the exhaust valve 4 by way of the first rocker arm 24. By contrast, when oil pressure is not supplied in the cylinder chamber 44, the displacement of the second exhaust cam 19 for the EGR mode is not transmitted from the second rocker arm 25 to the first rocker arm 24, and only the displacement of the first exhaust cam 19 for the normal mode is transmitted to the exhaust valve 4 by way of the first rocker arm 24. In such a structure, in the EGR mode, the exhaust valve 4 can be opened during the intake stroke, independently of the exhaust stroke.

The engine operation by the exhaust valve drive mechanism 20 having the above-described mode selection mechanism 40 will be explained below.

At the present, suppose the engine is running in the normal mode. At this time, the oil control valve 53 is closed, and oil pressure is not supplied into the route 51 in the rocker shaft 22. A tiny hole is opened in the oil control valve in order to supply a small amount of oil for lubrication of the rocker shaft 22 and first and second rocker arms 24, 25. This hole is small enough to allow flow of only a small amount of engine oil, and the oil pressure does not reach the level of pushing up the piston 46. Accordingly, as shown in FIGS. 3, 8 and 9, the piston 46 is pushed down by the elastic force of the coil spring 50, and the notch 49 is positioned in the window 45.

In this state, the poking portion 65 of the second rocker arm 25 rotated by the second exhaust cam 19 reciprocates inside of the notch 49 without contacting with the piston 46 as shown in FIGS. 8 and 9. That is, the movement of the second rocker arm 25 is not transmitted to the first rocker arm 24. Therefore, as shown in FIG. 8, only the motion of the first rocker arm 24 rotated by the first exhaust cam 18 is transmitted to the upper end of the valve stem 6, and the exhaust valve 4 is pushed up. As a result, the exhaust valve 4 is driven at the open/close timing and the amount of valve lift corresponding to the normal mode defined by the first exhaust cam 18. At the end of the valve stem of the intake valve 5, the transmission from the intake rocker am 16 (FIG. 1) is transmitted. Thus, the intake valve 5 is driven at the open/close timing and the amount of valve lift corresponding to the normal mode defined by the intake cam 15.

Figure 11:
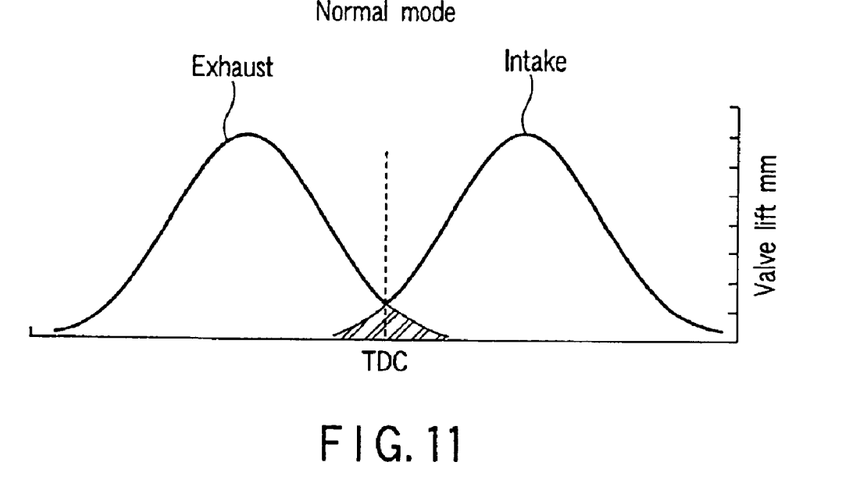
FIG. 11 is a diagram showing valve lift in an exhaust stroke and valve lift in an intake stroke in the normal mode.

In the normal mode, by driving the exhaust valve 4 and intake valve 5 as described above, the exhaust valve 4 and intake valve 5 are opened and closed at the timing of overlapping in part near the top dead center (TDC) of the piston 46 as shown, for example, in FIG. 11.

On the other hand, when EGR is necessary, the oil control valve 53 is opened. Then the engine oil passes through the route 51 in the rocker shaft 22, and is supplied into the lower part of the cylinder chamber 44, thereby pushing up the piston 46. As a result, as shown in FIG. 10, the outer circumference of the piston 46 is positioned in the window 45.

In this state, when the contact point of the second exhaust cam 19 gets into the contour profile that surpasses the base circle, the second rocker arm 25 is put in rotation, and the poking portion 65 of the second rocker arm 25 abuts against the outer circumference of the piston 46 as shown in FIG. 10. In this manner, the force in a direction of pushing down the piston 46 is transmitted to the first rocker arm 24 from the poking portion 65 of the second rocker arm 25 by way of the outer circumference of the piston 46. Since this force is in the same direction as the rotating direction of the first rocker arm 24, this force causes to rotate the first rocker arm 24, and this motion is transmitted to the upper end of the valve stem 6, thereby pushing up the exhaust valve 4.

The second exhaust cam 19 for the EGR mode is configured to open the exhaust valve 4 during the intake stroke at a delay of θ° from the first exhaust cam 18 for the normal mode. Therefore, as shown in FIG. 12, the exhaust valve 4 is opened as Exhaust 1 in the exhaust stroke (first time), and is then opened as Exhaust 2 while opening the intake valve 5 in the subsequent intake stroke (second time).

In this manner, by using the exhaust valve drive mechanism 20, the timing of releasing the intake valve 4 during the intake stroke can be set freely, independent of the exhaust stroke. Hence, as compared with the conventional method of assuring the EGR amount by setting the overlap period, restrictions are smaller and a sufficient amount of EGR is assured. That is, by releasing the exhaust valve 4 during the intake stroke, a large volume of exhaust gas can be mixed into the intake air as indicated in the shaded area of Exhaust 2 in FIG. 12. Moreover, as clear from FIG. 12, as compared with the EGR amount maintained during the overlap period, a greater amount of EGR is obtained. Accordingly, the effect of the internal EGR is outstandingly enhanced, the exhaust gas composition can be improved, and further the catalyst can be activated earlier. Of course, as shown in FIG. 12, this operation can be combined with the overlap.

Figure 12:
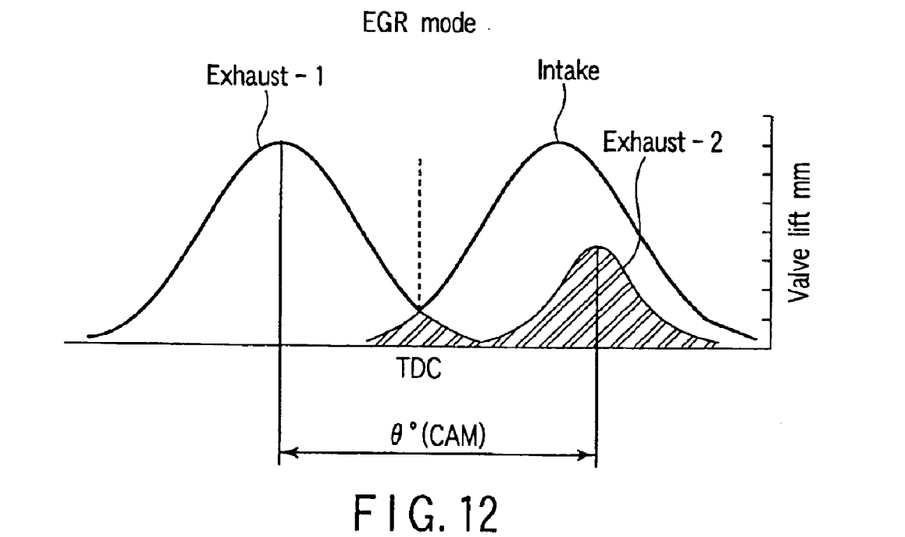
FIG. 12 is a diagram showing valve lift in the exhaust stroke, valve lift in the intake stroke, and valve lift of the exhaust valve released in the intake stroke in the EGR mode.

Preferably, as shown in FIG. 12, the exhaust valve 4 is released at the point of time when the amount of valve lift of the intake valve 5 reaches the maximum in the intake stroke. Therefore, within a predetermined range of the intake stroke, the exhaust valve 4 can be opened and closed while keeping a large amount of valve lift, so that a greater amount of EGR is assured.

In this example, the first exhaust cam 18 for the normal mode and the second exhaust cam 19 for the EGR mode are combined in the exhaust valve drive mechanism 20, so that the exhaust valve 4 can be opened and closed easily during the intake stroke.

(Second Embodiment)

Figure 13:
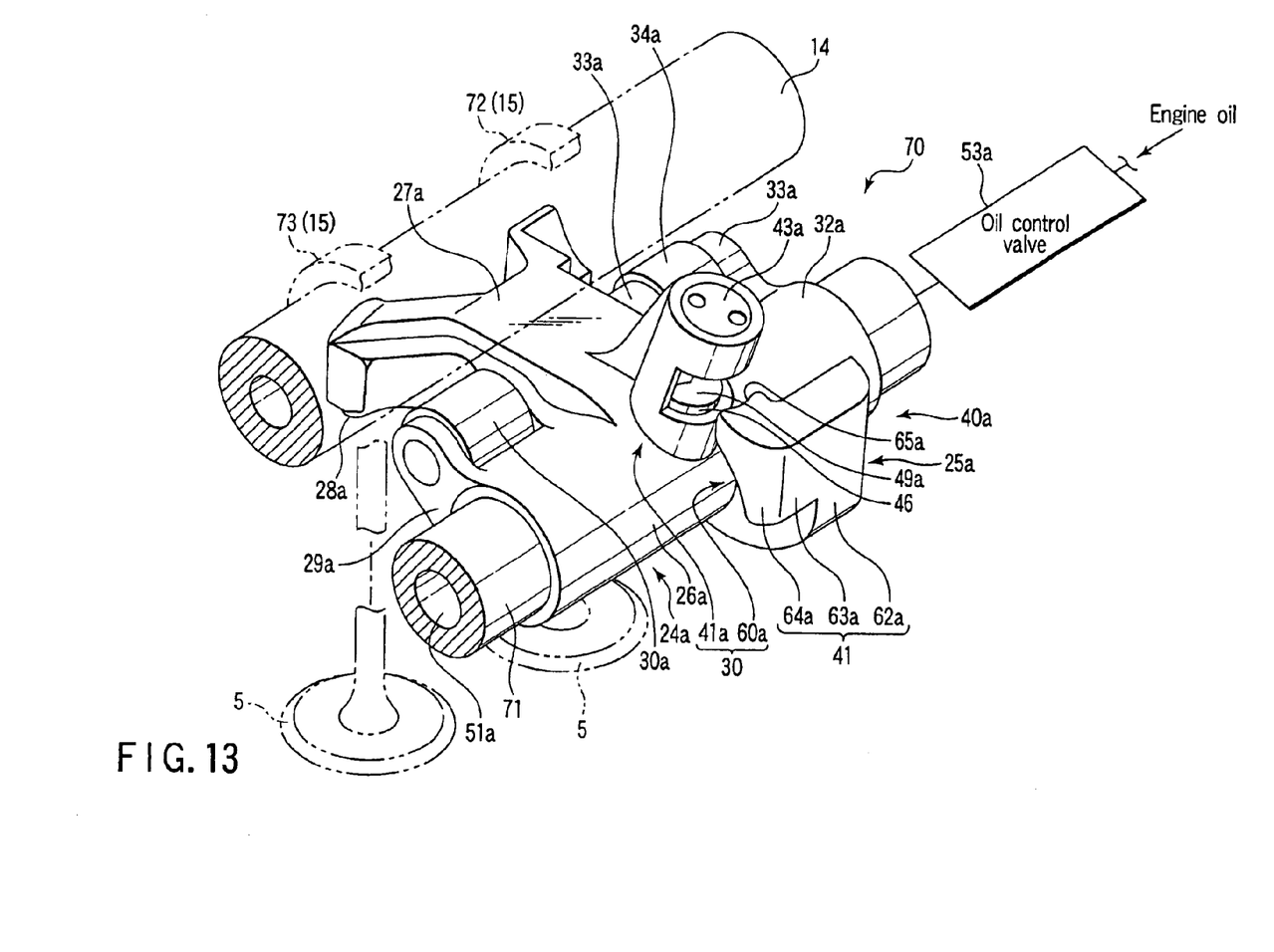
FIG. 13 is a perspective view showing a schematic configuration of an intake valve drive mechanism according to a second embodiment of the invention.
Figure 14A:
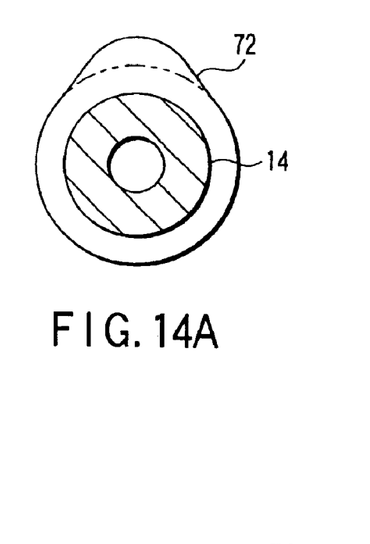
FIG. 14A is a diagram showing a second intake cam for driving an intake valve in the normal mode.
Figure 14B:
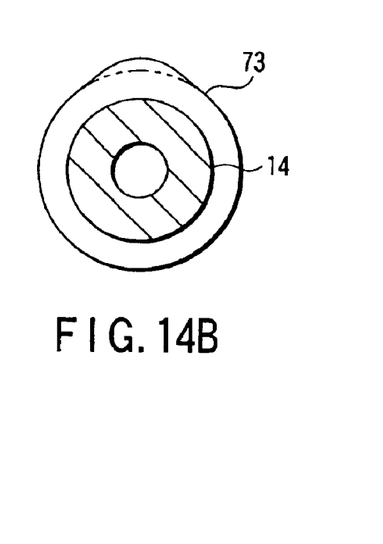
FIG. 14B is a diagram showing a first intake cam for driving the intake valve in the EGR mode.
Figure 15:
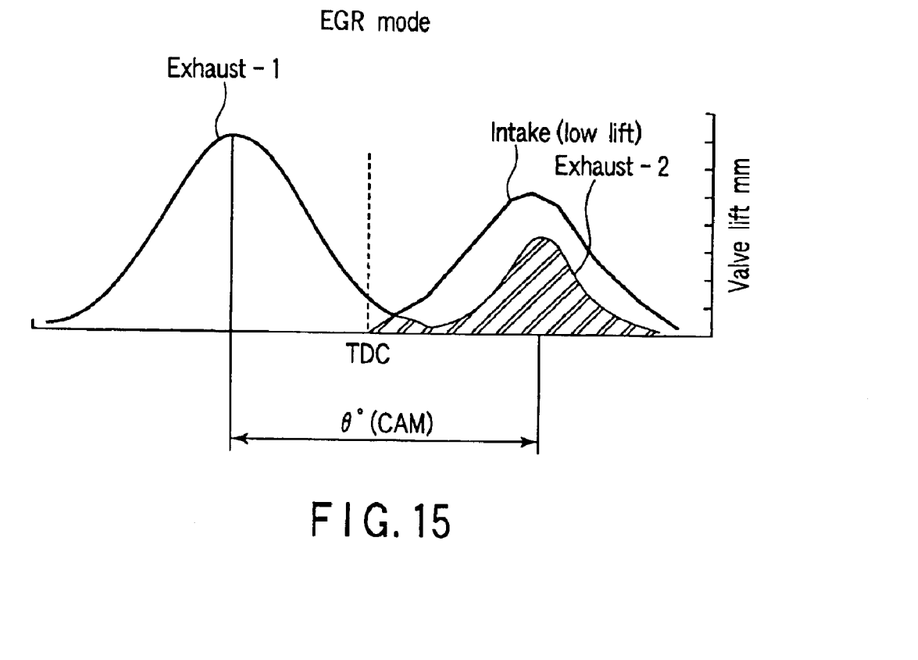
FIG. 15 is a diagram showing valve lift in the exhaust stroke, valve lift in the intake stroke, and valve lift of the exhaust valve released in the intake stroke in the EGR mode.

A second embodiment of the invention will be shown in FIGS. 13 to 15. In this embodiment, in order to further enhance the effect of the internal EGR, in addition to the exhaust valve drive mechanism 20 for enabling to release the exhaust valve 4 during the intake stroke, an intake valve drive mechanism 70 is provided, which is intended to vary the amount of valve lift of the intake valve 5 in the intake stroke. By using this intake valve drive mechanism 70, it is controlled, in the EGR mode, such that the amount of valve lift of the intake valve 5 is smaller than the amount of valve lift in the normal mode.

More specifically, a mode selection mechanism 40a, which is similar to the mode selection mechanism 40 in the first embodiment, is assembled in the cam shaft 14 for intake and a rocker shaft 71 for intake as shown in FIG. 13.

The components of the mode selection mechanism 40a are basically same as components of the mode selection mechanism 40, and description is omitted. The members in FIG. 13 are identified with same reference numerals with the appendix of "a" in order to distinguish from those of the mode selection mechanism 40 shown previously.

The difference between the mode selection mechanism 40a and the mode selection mechanism 40 is as follows: the second rocker arm 25a is used for transmitting the (normal) amount of valve lift to the intake valve in the normal mode, and the first rocker arm 24a is used for transmitting the relatively small amount of valve lift to the intake valve in the EGR mode. A second intake cam 72 on the cam shaft 14 contacting with the second rocker arm 25a has a contour profile for defining the amount of valve lift in the normal mode as shown in FIG. 14A. A first intake cam 73 on the cam shaft 14 contacting with the first rocker arm 24a has a contour profile for defining the relatively small amount of valve lift in the EGR mode as shown in FIG. 14B. Herein, the amount of valve lift given by the first intake cam 73 to the intake valve 5 in the EGR mode is larger than the amount of valve lift given from the second exhaust cam 19 (FIG. 2B) to the exhaust valve 4 in the EGR mode.

By using the intake valve drive mechanism 70 having such a mode selection mechanism 40a, in the normal mode, the second rocker arm 25a is coupled to the first rocker arm 24a, the displacement of the second intake arm 72 is transmitted to the upper end of the intake valve 5 (FIG. 1) by way of the second rocker arm 25a and first rocker arm 24a, and the intake valve 5 is driven. In this case, since the displacement of the first intake cam 73 is smaller than the displacement of the second intake cam 72, and the both are matched in phase, the displacement of the first intake cam 73 is not transmitted to the first rocker arm 24a. By contrast, in the EGR mode, the second rocker arm 25a is separated from the first rocker arm 24a, and only the displacement of the first intake cam 73 is transmitted to the upper end of the intake valve 5 by way of the first rocker arm 24a, and the intake valve 5 is driven.

Thus, by using the intake valve drive mechanism 70 together with the exhaust valve drive mechanism 20, in the EGR mode, the air suction amount in the intake stroke is suppressed as shown in FIG. 15. As a result, the EGR rate is heightened, and the internal EGR is realized at a higher effect. Such a combination of two mechanisms is very effective in idling operation of a large excess air rate of a diesel engine particularly demanding earlier activation of the catalyst, and in the case desired to increase the exhaust temperature during low load operation.

The invention is not limited to the illustrated embodiments alone, but may be changed and modified variously within the range not departing from the scope or true spirit of the invention. For example, in the foregoing embodiments, the invention is applied in the diesel engine, but not limited to this example, the invention may be applied in a gasoline engine or other engines. In the embodiments, the variable transmission mechanism of push-contact type is used for coupling and separating the first rocker arm 24 (24a) and second rocker arm 25 (25a), but not limited to this example, the exhaust valve may be released during the intake stroke or the intake valve may be released by a low amount of valve lift in the EGR mode, by an exhaust valve drive mechanism and intake valve drive mechanism employing other structures or means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A valve drive apparatus of an internal-combustion engine, comprising:

an exhaust valve drive mechanism for changing an open/close timing of an exhaust valve, wherein the exhaust valve drive mechanism comprises a first exhaust cam for controlling the exhaust valve releasing timing and the amount of valve lift during an exhaust stroke in a normal mode, and a second exhaust cam for controlling the exhaust valve releasing timing and the amount of valve lift during an intake stroke in an EGR mode; and a control device for controlling the exhaust valve drive mechanism to release the exhaust valve during the intake stroke using the second exhaust cam, independently of the exhaust stroke, in the EGR mode.

2. The valve drive apparatus according to claim 1, wherein the exhaust valve drive mechanism is configured to release the exhaust valve in the vicinity of the point of time when the amount of valve lift of an intake valve reaches the maximum value during the intake stroke.

3. The valve drive apparatus according to claim 1, further including a mode selection mechanism which transmits the displacement of the first exhaust cam to the exhaust valve in the normal mode, and transmits the displacement of the second exhaust cam to the exhaust valve, in addition to the displacement of the first exhaust cam, in the EGR mode.

4. A valve drive apparatus of an internal-combustion engine, comprising:
an exhaust valve drive mechanism for changing an open/close timing of an exhaust valve;
an intake valve drive mechanism for setting the amount of valve lift of an intake valve during an intake stroke in an EGR mode;
a control device for controlling the exhaust and intake valve drive mechanisms,
wherein the control device controls the exhaust valve mechanism to release the exhaust valve during the intake stroke, independently of an exhaust stroke, in the EGR mode, and controls the intake valve drive mechanism so that the amount of valve lift of the intake valve in the EGR mode is smaller than the amount of valve lift in a normal mode.

5. A method of controlling a valve drive apparatus of an internal-combustion engine, comprising the steps of:
providing an exhaust valve drive mechanism for changing an open/close timing of an exhaust valve, wherein the exhaust valve drive mechanism comprises a first exhaust cam for controlling the exhaust valve releasing timing and the amount of valve lift in an exhaust stroke in a normal mode, and a second exhaust cam for controlling the exhaust valve releasing timing and the amount of valve lift during an intake stroke in an EGR mode;
controlling the exhaust valve drive mechanism to release the exhaust valve during the intake stroke with the second exhaust cam, independently of the exhaust stroke, in the EGR mode.

6. The method of controlling a valve drive apparatus according to claim 5, wherein the exhaust valve drive mechanism releases the exhaust valve in the vicinity of the point of time when the amount of valve lift of the intake valve reaches the maximum value during the intake stroke.

7. The method of controlling a valve drive apparatus according to claim 5,
wherein the displacement of the first exhaust cam is transmitted to the exhaust valve in the normal mode, and the displacement of the second exhaust cam is transmitted to the exhaust valve, in addition to the displacement of the first exhaust cam, in the EGR mode.

8. A method of controlling a valve drive apparatus of an iternal-combustion engine, comprising the steps of:
providing an exhaust valve drive mechanism for changing the open/close timing of an exhaust valve;
providing an intake valve drive mechanism for setting the amount of valve lift of an intake valve during an intake stroke in an EGR mode,
wherein the exhaust valve drive mechanism releases the exhaust valve during the intake stroke, independently of an exhaust stroke, in the EGR mode, and
wherein the intake valve drive mechanism allows the amount of valve lift of the intake valve in the EGR mode to be smaller than the amount of valve lift in a normal mode.

* * * * *